OYSTEIN BOYUM,
FINN ENOK FOLKESTAD and
ASBJORN TORVUND,
INVENTORS

United States Patent Office 3,729,550
Patented Apr. 24, 1973

3,729,550
PROCESS FOR THE PURIFICATION OF AQUEOUS MAGNESIUM CHLORIDE SOLUTIONS
Oystein Boyum, Skien, Finn Enok Folkestad, Heistad, and Asbjorn Torvund, Porsgrunn, Norway, assignors to Norsk Hydro A.S., Oslo, Norway
Filed Apr. 12, 1971, Ser. No. 133,151
Claims priority, application Norway, Apr. 16, 1970, 1,447/70
Int. Cl. C01f 5/30
U.S. Cl. 423—497    6 Claims

ABSTRACT OF THE DISCLOSURE

A process is provided for the purification of magnesium chloride solutions which are to be converted to low-moisture or anhydrous magnesium chloride for molten salt electrolysis. The process comprises three steps, and calcium ions and sulphide ions are added in the first step, the solution is treated with an oxidizing agent in the second step, and barium ions are added to the solution in the third step.

---

Figure 1:
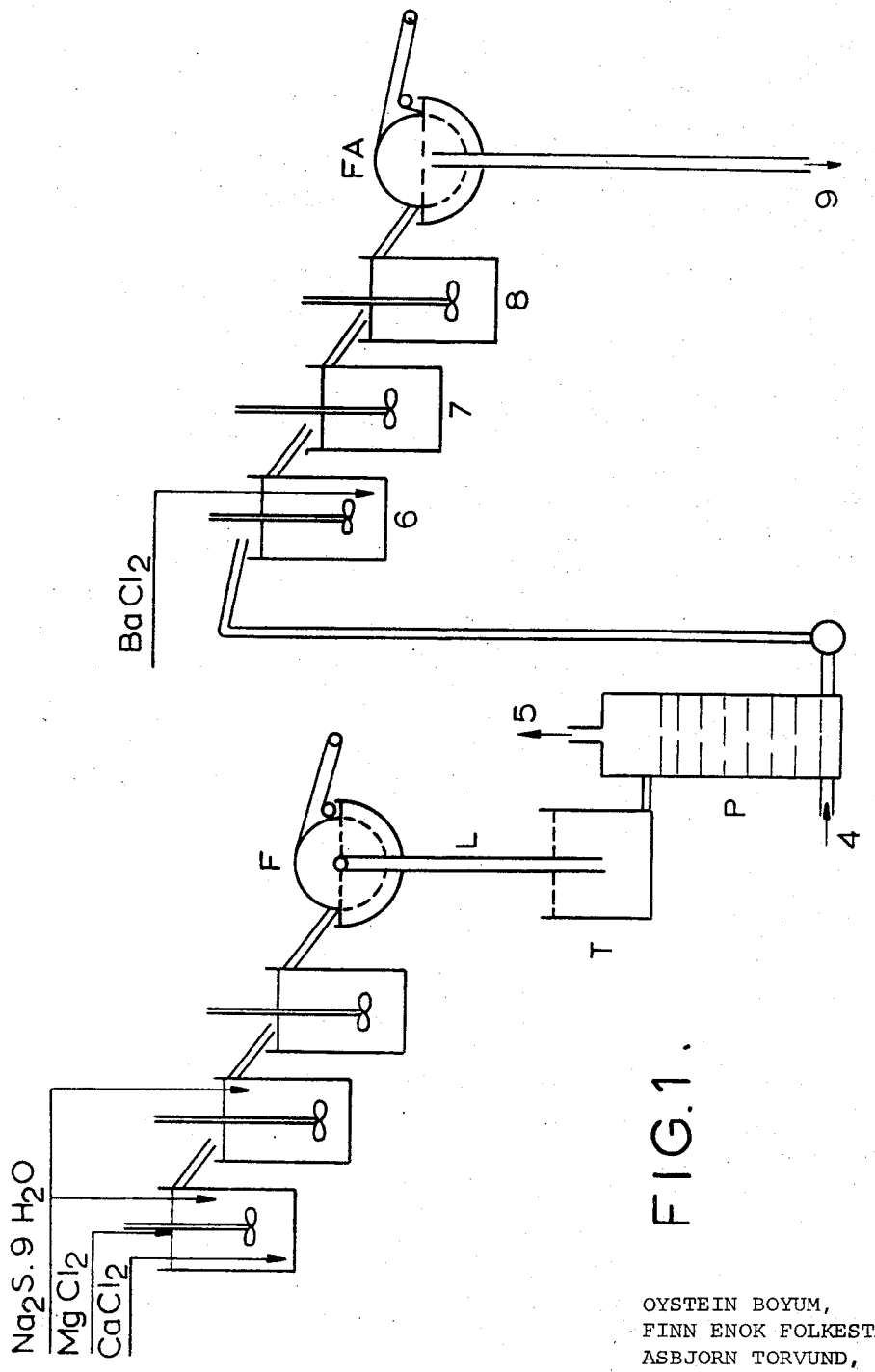

The invention relates to a process for purification of aqueous magnesium chloride solutions which are to be converted to low-moisture or anhydrous magnesium chloride for electrolysis.

The $MgCl_2$ solutions used for the preparation of dehydrated $MgCl_2$ for electrolysis, are usually solutions resulting from the processing of natural brines. Such solutions frequently contain sulphates, f.inst. 1%, and bromides, f.inst. 0.1%. In addition the solution is usually contaminated with small amounts of heavy metals, particularly iron. In Winnacker/Weingaertner: "Chemische Technologie," volume V, pages 110–111, it is stated that iron etc. may be removed from natural brines and salt deposits by addition of magnesia. The heavy metals mentioned in the following (iron, nickel, copper and manganese) are the most common ones in commercially available magnesium chloride solutions.

Heavy metals in the magnesium chloride used in the molten electrolyte will give heavy metals in the magnesium metal prepared, which is undesired. It is f.inst. usually required that the nickel content in the magnesium metal should be less than 10 p.p.m. Similar requirements also apply to copper, and for certain qualities of magnesium also to manganese. Further, iron and manganese may cause difficulties in the electrolysis, in which the iron content should be less than 100 p.p.m. In general, even in small concentrations heavy metals are detrimental in the electrolysis and/or undesired in the final magnesium metal.

In the molten salt electrolysis of magnesium chloride for the preparation of magnesium and magnesium chloride is dissolved in a major amount of alkali and alkaline earth metal chlorides, such as sodium, potassium, lithium and calcium chlorides. The composition of the electrolyte is chosen with consideration to, in addition to economic factors, a number of technological factors, such as the conductivity of the electrolyte, melting range, viscosity, wetting properties, volatility and decomposition voltage. In addition to chlorides small amounts of fluorides, such as 1%, are often added. On the other hand there are several substances which are not desired in the electrolyte, particularly boron, sulphates, bromine and heavy metals, such as iron, nickel, copper and manganese.

For the preparation of magnesium chloride suitable for melt electrolysis it is known that undesired elements may be substantially removed as volatile chlorides by heating in the presence of carbon and chlorine gas. In the known preparation of molten anhydrous magnesium chloride from a mixture of magnesia and carbon in the presence of chlorine gas, the magnesium chloride simultaneously undergoes an effective purification.

In the treatment of magnesium chloride solutions it is known to precipitate sulphate as calcium sulphate or as barium sulphate. Further, it is known per se that by means of chlorine one can oxidize bromide to bromine and strip it off.

The process of the invention relates to a combination of steps, which makes it possible to remove heavy metals, such as iron, nickel, copper and manganese, as well as sulphate and bromide in only three treatment steps. The solution then obtained is very well suited for a subsequent boron removal step, the solution being filtered and freed from substances which relatively readily undergo partial precipitation causing difficulties in the boron removal step.

According to the invention we provide a process for the purification of magnesium chloride solutions which are to be converted to low-moisture or anhydrous magnesium chloride for molten salt electrolysis. The process is characterized in that (a) at a pH of 4–8 sulphates are precipitated by addition of calcium ions, and heavy metals are precipitated by addition of sulphide ions, and the precipitate is separated off, (b) the solution is then treated with an oxidizing agent, and the bromine formed by oxidation of bromide is stripped off in gaseous form, residual sulphides being oxidized to sulphates, (c) whereafter barium ions are added to the solution, and the precipitate is separated off.

As far as we know the specific combination of process steps according to the invention has previously not been suggested. By carrying out the sulphide precipitation of certain heavy metals in the first main step and then the removal of bromine in the subsequent step (the oxidation step), we achieve that in addition to the removal of bromine the excess of sulphide is oxidized to sulphate, viz the same anion which is precipitated in the first main step as calcium sulphate. However, the precipitation in the first main step is not as complete as desired, and a completing precipitation of sulphates as barium sulphate is therefore desirable in any case. A precipitation of the sulphate originating from the excess of sulphide is then achieved simultaneously. With a certain right it may therefore be said that each of the three main steps has a double purpose (i.e. double advantage). In the first main step the precipitated calcium sulphate acts as filter aid for the very small amounts of sulphides precipitated, as described below.

The first main step, step (a), is advantageously carried out at a pH between 4 and 8, preferably between 5 and 6, as measured in a solution diluted to about 200–250 g. $MgCl_2/l$. This choice of pH has been made with due regard to the filter-ability as well as to the solubility of $CaSO_4$ and heavy metal sulphides, such as NiS and others having relatively high solubility product, and to the fact that f.inst. $Al^{+++}$ and $Fe^{+++}$ form very slightly soluble hydroxides in this pH range. Further, $MnO_2$ is stable in this pH range when the chloride concentration is high.

An embodiment of the invention comprises that in a continuous process several precipitation vessels are used, preferably three, in main step (a), and that the liquid streams, i.e. magnesium chloride solution and solutions containing calcium and sulphide ions, are introduced in the first precipitation vessel, sulphide ions being added to the second precipitation vessel as well.

Other features and advantages of the invention will appear from the following description.

The purification of concentrated salt solutions presents particular difficulties, since the precipitated material usually will be poorly filterable. The process of the invention in which calcium sulphate and hydroxides/oxides and sulphides are coprecipitated, has turned out to give a very well filterable precipitate. The sulphate presumably acts as filter-aid.

In the subsequent step (b), in which bromine is stripped off with chlorine, there is simultaneously achieved that the remaining sulphide ions after the precipitation in the first main step (a) are oxidized to sulphate, and also that manganese salts are oxidized to form the very slightly soluble $MnO_2$. Thereby everything has been made ready for a final complete precipitation of sulphate as barium sulphate in the third main step. Filtering after the second main step is not necessary as $MnO_2$ is filtered off after the third main step (c) together with barium sulphate.

In the following the three main steps in the process of the invention will be discussed more fully in the order in which they are carried out.

For the purification of concentrated magnesium chloride solution we have found it advantageous to dilute it to about 400 g. $MgCl_2$/litre.

(a) First main step (a) may be carried out batchwise. It is advantageous to operate with a warm solution (60–70° C.). For the precipitation of sulphate, calcium ions, preferably in the form of calcium chloride solution, are slowly added with stirring. Sulphide ions are preferably added in the form of sodium sulphide solution. However, sodium sulphide is hydrolyzed to give $H_2S$ gas, which partly escapes. It is therefore necessary with continual addition of $H_2S$, optionally sulphide ions, to obtain an essentially complete precipitation of heavy metals. After about 4 hours at 50–80° C. using continuous stirring a filterable product is obtained.

However, the first main step is most advantageously carried out continuously in several stages, since the precipitation thereby will be more complete, and the precipitated calcium sulphate is obtained in a well filterable form. A preferred embodiment comprises precipitation in three stages using three precipitation vessels having the same size and a total volume of 2–5 times the amount of solution purified per hour. The temperature is most advantageously 60–70° C.

Magnesium chloride solution and calcium chloride solution are added to the first precipitation vessel. The excess of calcium ions is chosen taking into consideration the calcium content desired or tolerated in the purified chloride, which depends on the intended electrolyte composition.

It has been found that the precipitation of metals forming slightly soluble sulphides is best obtained when sulphide ions are added to the first two or all three precipitation vessels. We then obtain essentially quantitative removal of such metals and at the same time we only get an insignificant content of sulphide ions in the solution after sulphides and calcium sulphate has been filtered off.

The solution of sulphide ions which is to be added in the first main step can be premixed with the solution of calcium ions, but separate streams are preferred since this provides the best control of the precipitation processes.

Continuous precipitation in three stages has been found to provide about 10 times larger crystals of hydrated calcium sulphate and thereby better filterability than by batchwise precipitation. The filtering of calcium sulphate etc. is advantageously carried out by means of a rotating filter having a thin, smooth and dense filter cloth, and using continuous washing of the filter cloth with water which is made to flow through the cloth in the opposite direction of the solution. Due to a secondary precipitation of calcium sulphate from the solution occuring on cooling, the solution is constantly stirred. Before the solution is passed to the second main step, its pH is advantageously adjusted to a value lower than 6 as measured after dilution with water to about 250 g. $MgCl_2$/litre. Thereby the formation of deposits is prevented in the apparatus (f.inst. a plate column) employed for the bromide removal in the next main step.

(b) In the second main step the filtered solution from the first main step is treated with a suitable oxidizing agent. In principle it is possible to use an oxidizing agent in gaseous form, liquid state or a dissolved solid substance. Since a residual content of oxidizing agent in the solution after treatment is normally not desired, it is most suitable to choose an oxidizing agent which may be easily stripped off from the solution. We prefer to employ chlorine gas diluted with air, suitably air containing about 0.2% chlorine gas by volume. This concentration is not critical, nor is the amount of air used per litre of solution. Normally it will be sufficient to use about 700 litres of chlorine-containing air per litre of solution. A completely satisfactory oxidation is then obtained, and the bromide content is practically eliminated. In a treatment as described herein the bromide content can f.inst. be reduced from about 350 p.p.m. to about 4 p.p.m. Further, in this main step any residual amounts of divalent manganese are oxidized to tetravalent, divalent iron to trivalent, and $MnO_2$ and $Fe(OH)_3$ are precipitated and filtered off together with barium sulphate in the third main step.

(c) With respect to the apparatus the third main step may be identical with the first main step. The precipitation of sulphates by addition of barium ions, suitably added in the form of barium chloride solution, may be carried out batchwise using a long residence time. However, also in this step it is advantageous to have a continuous process, preferably with three precipitation vessels. Barium chloride solution and magnesium chloride solution are then preferably added to the first precipitation vessel in such a manner that too high local over-saturation of barium ions and sulphate ions in the precipitation vessel is avoided. We achieve this by feeding one of the two liquid streams to the surface of the suspension in the precipitation vessel, while the other liquid stream is introduced near the bottom of the vessel through a tube. Introducing barium chloride solution and magnesium chloride solution in such a manner that a too high local over-saturation is obtained will result in the formation of small-sized barium sulphate crystals which are difficult to filter off, and which also entail a clearly increased solubility of barium sulphate.

The excess of barium ions in the solution after the third main step is chosen with due consideration to the requirements stipulated with respect to the sulphur content of the purified solution and to the barium content in the final magnesium chloride electrolyte.

The precipitation may advantageously be carried out at 60–70° C. or somewhat higher temperature. For the filtration the same type of filter equipment as in the first main step is suitably employed.

FIG. 1 is a diagrammatic illustration of the process of the invention. There are shown three precipitation vessels, 1, 2, 3, magnesium chloride solution ($MgCl_2$) and calcium chloride solution ($CaCl_2$) being fed to the first precipitation vessel 1, while sodium sulphide solution ($Na_2S.9H_2O$) is fed to the first as well as to the second precipitation vessel. The filtration is effected by means of a rotating filter F having internal suction. Through an axial filtrate outlet and a barometric leg L the filtrate is passed to a tank T and then to a plate column P in which it is contacted with chlorine-containing air, introduced through an inlet 4 near the bottom. The column is provided with a gas outlet 5 at the top. From the column the solution is pumped to the first of three precipitation vessels 6, 7, 8 in the final main step, to which barium chloride solution (BaCl₂) is fed. The solution is then passed to a filtration apparatus FA, and purified solution is recovered through an outlet 9.

Normally the filter cake on both filters F and FA will contain metal oxides and/or hydroxides. If aluminium or silicon compounds are present, these will substantially be separated off on filter F.

The above process for the purification of magnesium chloride solution has been tested in several experiments in the laboratory and in the pilot plant. The first main step of the precipitation has been carried out batchwise and continuously varying the number of precipitation vessels. As mentioned, we have found three precipitation vessels most suitable. This also applies to the third main step.

In the pilot plant the experiments were carried out with capacities of 100–200 litres/h. We have found it advantageous to use three precipitation vessels all having the same size. In the experiments there were used precipitation vessels containing 150 litres of solution for the calcium sulphate precipitation as well as for the barium sulphate precipitation.

Figure 2A:
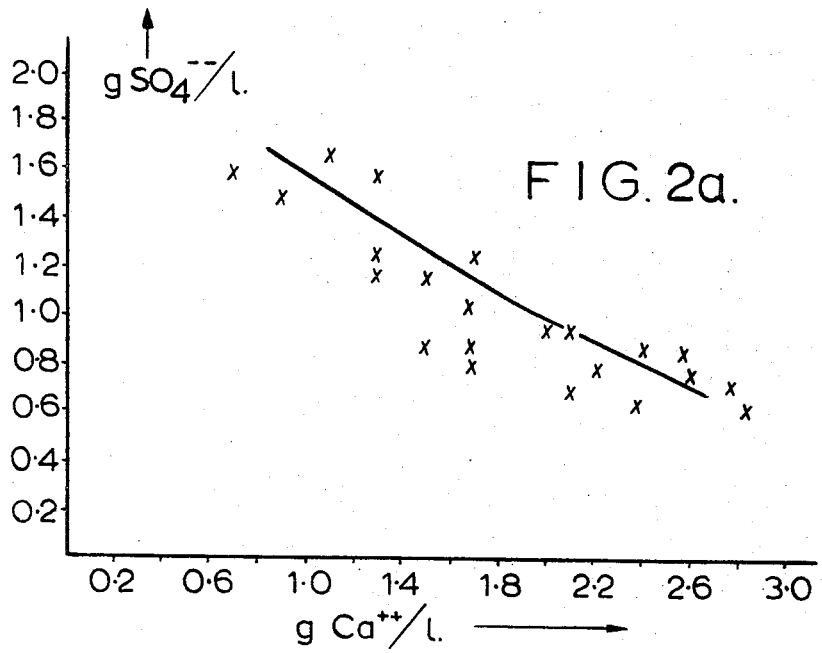

The sulphate content in the filtrate after the calcium sulphate precipitation depends primarily on the excess of calcium chloride, the precipitation temperature and filtering conditions. Data from typical experiments involving continuous precipitation in pilot plant with varying excess of calcium chloride appear from FIG. 2a, illustrating grams of $SO_4^{--}$/litre (ordinate) as a function of the excess of calcium in grams of $Ca^{++}$/litre (abscissa).

By the addition of 0.25–0.5 g. Na₂S.9H₂O per litre of solution distributed to either the two first or all three precipitation vessels in the calcium sulphate precipitation we have lowered a content of 15 p.p.m. of each of the metal ions $Cu^{++}$, $Mn^{++}$, $Fe^{++}$ and $Ni^{++}$ to less than 2 p.p.m.

In the second main step the solution was treated in a plate column in counter current with chlorine-containing air. In the pilot plant there was used a column having 8 hole plates and having a capacity of 100–150 l. of purified solution per hour. During the experiments the amount of air varied within the range of 500–700 l. per litre of solution, and the chlorine content of the air was 0.15–0.20% by volume. The bromide content of the solution was lowered from about 350 mg. Br/l. to 5–10 mg. Br/l. of solution. After the chlorine treatment sulphide ions could not be detected in the solution.

Figure 2B:
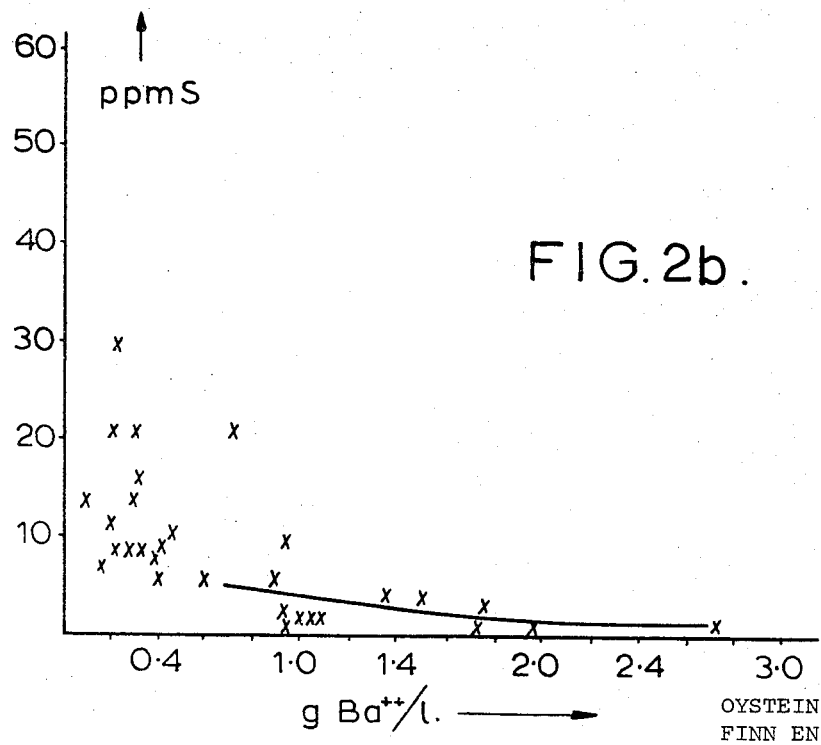

It appears from FIG. 2b which illustrates p.p.m. of sulphur (ordinate) as a function of the excess of barium in grams $Ba^{++}$/l. (abscissa), that with a barium excess of at least 1 gram Ba/l. of solution the sulphate content in the filtrate calculated as sulphur will be less than 10 p.p.m. S, usually less than 5 p.p.m. S. The reason for the spread in sulphur content as a function of the barium content was found to be the variations in the mechanical condition of the rotating filter, the filtering effectivity and the crystal size of the precipitated barium sulphate. A filter in technical scale in good mechanical condition together with optimum precipitation conditions will provide an even better result.

Curves No. 1 and 2 relate to experiments in which the solution contained 400 grams of MgCl₂/litre, and in which the temperature in the first as well as in the third main step was about 70° C. The capacity of the plant was about 100 litres of solution per hour. The process of the invention is however not limited to such conditions.

The following example represents a representative continuous run.

EXAMPLE

The apparatus was generally as illustrated on FIG. 1. Three precipitation vessels each having a volume of 150 litres were used for the calcium sulphate precipitation as well as for the barium sulphate precipitation. The column P was a plate column having 8 hole plates and a capacity of 120 l./h. On the rotating filters F and FA a thin, smooth cloth was used.

The starting solution contained 440 grams of MgCl₂/litre, 20 grams of $SO_4^{--}$/litre, 15 p.p.m. $Cu^{++}$, 4 p.p.m. $Mn^{++}$, 10 p.p.m. $Fe^{++}$, 15 p.p.m. $Ni^{++}$, and 400 p.p.m. $Br^{-}$. In addition the starting solution contained 0.5% of NaCl and 0.2% of KCl.

| Feed to step (a) | Concentration, grams/l. | Amount, litres/hour | Temp., °C. |
|---|---|---|---|
| Starting solution | 440 | 100 | 70 |
| CaCl₂-solution | 400 | 6.8 | 20 |
| Na₂S.9 H₂O-solution: | | | |
| 1st precipitation vessel | 300 | 0.04 | 20 |
| 2d precipitation vessel | 300 | 0.04 | 20 |

The filtrate from the filter F was adjusted to a pH of 5.5 (measured after dilution to 250 grams MgCl₂/litre) in the tank T by addition of hydrochloric acid, and was then treated with chlorine-containing air in the column P. Said air had a temperature of 20° C. and a chlorine content of 0.2 percent by volume, and was introduced in an amount of 80 Nm.³/hour.

In the third main step the solution was fed to the first precipitation vessel close to the surface of the liquid, while a solution containing 200 grams of BaCl₂ per litre was fed to the same vessel close to the bottom in an amount of 2.3 litres/hour.

The run was continued for 5 days, during which the pH and temperature conditions generally were as follows:

| | pH | Temp., °C. |
|---|---|---|
| Precipitation vessels of— | | |
| 1st main step | 6–6.5 | 70 |
| 3d main step | ca. 5.5 | 70 |

Samples of the purified solution from the filter FA were taken every 4th hour. Typical analyses were:

|  | P.p.m. |
|---|---|
| Sulphate (as $SO_4^{--}$) | 20–50 |
| Bromide (as $Br^-$) | 6–20 |
| Copper | 0 |
| Nickel | 0.1–0.6 |
| Manganese | Trace |
| Iron | Trace |

There was no deposit of calcium sulphate or other substances in the column P.

What is claimed is:

1. Process for the purification of magnesium chloride solutions containing sulphates, heavy metals and bromides which are to be converted to low-moisture or anhydrous magnesium chloride for molten salt electrolysis, characterized in that
   (a) at a pH of 4–8 sulphates are precipitated by addition of calcium ions and heavy metals are precipitated by addition of sulphide ions, and the precipitates are separated off,
   (b) the solution is then treated with an oxidizing agent, and the bromine formed by oxidation of bromide is stripped off in gaseous form, residual sulphides being oxidized to sulphates,
   (c) whereafter barium ions are added to the solution, and the precipitate comprising barium sulphate, heavy metal oxides and hydroxides is separated off.

2. The process according to claim 1, characterized in that the oxidizing agent in step (b) is diluted chlorine gas.

3. The process according to claim 1 in which several precipitation zones in series are used in step (a), characterized in that the magnesium chloride solution, a solution containing calcium ions and a solution containing sulphide ions are introduced in the first precipitation zone, and the solution containing sulphide ions is fed to the second precipitation zone as well.

4. Process according to claim 1, characterized by using a temperature in main step (a) of 60–70° C.

5. Process according to claim 1, characterized in that the pH value of the solution is adjusted to 5–6 before the solution from step (a) is passed to step (b).

6. Process according to claim 1 in which several precipitation zones in series are used in step (c) and characterized in that the solution from step (b) and the solution of barium ions are fed to the first precipitation zone of step (c) at inlet points having a maximal distance between them within said first precipitation zone.

References Cited

UNITED STATES PATENTS

| 1,793,906 | 2/1931 | Christensen | 23—134 |
| 2,082,989 | 6/1937 | Thomsen | 23—216 |
| 2,090,446 | 8/1937 | Gardner | 23—134 |
| 2,393,115 | 1/1946 | MacMullin | 23—91 |
| 2,398,743 | 4/1946 | Heath et al. | 23—91 |
| 2,670,271 | 2/1954 | Thomsen | 23—119 |
| 2,759,794 | 8/1956 | Fuchsman | 23—91 |
| 2,860,952 | 11/1958 | Bergeron et al. | 23—134 |
| 3,218,161 | 11/1965 | Kunda et al. | 23—134 X |

FOREIGN PATENTS

| 11,101 | 8/1962 | Japan | 23—91 |

EDWARD STERN, Primary Examiner

U.S. Cl. X.R.

423—498, 554; 204—70